United States Patent [19]
Harris

[11] Patent Number: 5,402,096
[45] Date of Patent: Mar. 28, 1995

[54] TRANSDUCERS

[75] Inventor: Ian P. Harris, Poole, United Kingdom

[73] Assignee: Penny & Giles Position Sensors Limited, Dorset, United Kingdom

[21] Appl. No.: 35,244

[22] Filed: Mar. 22, 1993

[30] Foreign Application Priority Data

Mar. 27, 1992 [GB] United Kingdom ............ 9206710.7

[51] Int. Cl.$^6$ .................................................. 336 135
[52] U.S. Cl. ................................................... 336/130
[58] Field of Search ................................ H01F 21/06

[56] References Cited

U.S. PATENT DOCUMENTS

| | | | |
|---|---|---|---|
| 2,341,346 | 2/1944 | Summerhayes, Jr. | 336/79 |
| 2,488,734 | 11/1949 | Mueller | 336/135 |
| 2,495,741 | 1/1950 | Labin et al. | 336/79 |
| 2,864,066 | 12/1958 | Egbert et al. | 336/134 |
| 2,949,576 | 8/1960 | Bolton | 336/135 |
| 3,550,053 | 12/1970 | Carlo | 336/135 |
| 3,819,025 | 6/1974 | Fushida et al. | 336/135 |
| 4,031,496 | 6/1977 | Fujiwara et al. | 336/134 |
| 4,777,436 | 10/1988 | Fiori, Jr. | 336/130 |

FOREIGN PATENT DOCUMENTS

| | | |
|---|---|---|
| 900549 | 8/1959 | United Kingdom . |
| 1275787 | 5/1972 | United Kingdom ............ 336/135 |

Primary Examiner—Thomas J. Kozma
Attorney, Agent, or Firm—Jay H. Maioli

[57] ABSTRACT

A transducer comprises a pair of inductive coils connected in series. The coils of the pair are arranged adjacent one another with respective end faces of the coils substantially mutually aligned. A magnetically permeable member is movable relative to the end faces in such a manner that the impedance offered to an AC signal by one coil increases while the impedance offered to the signal by the other coil decreases. The end faces of the coils may be curved and arranged diametrically opposite one another around the circumference of a circle, and the magnetically permeable member may comprise a generally semi-circular plate, rotatable about an axis passing through the center of the circle, for covering approximately half of the total area of the end faces of the coils. This arrangement provides for linearity of output voltage variation with angular position of the plate. To reduce the effect of axial displacement of the plate on output voltage, two opposing pairs of coils may be provided, the plate being located between the pairs of coils.

6 Claims, 3 Drawing Sheets

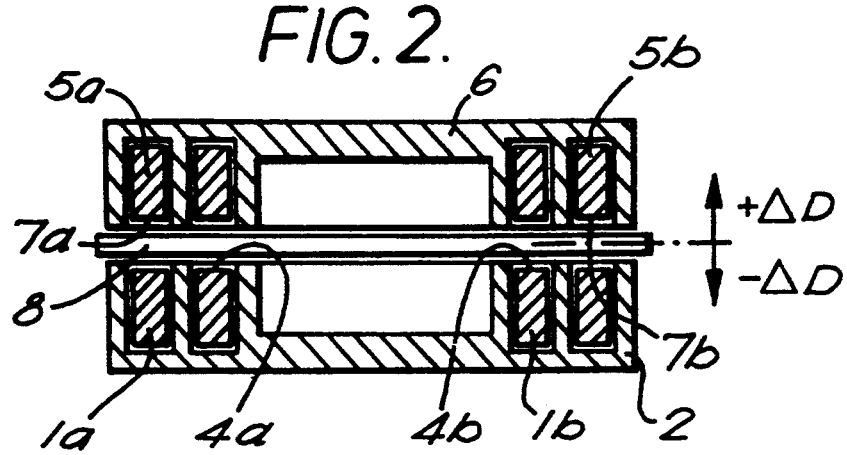
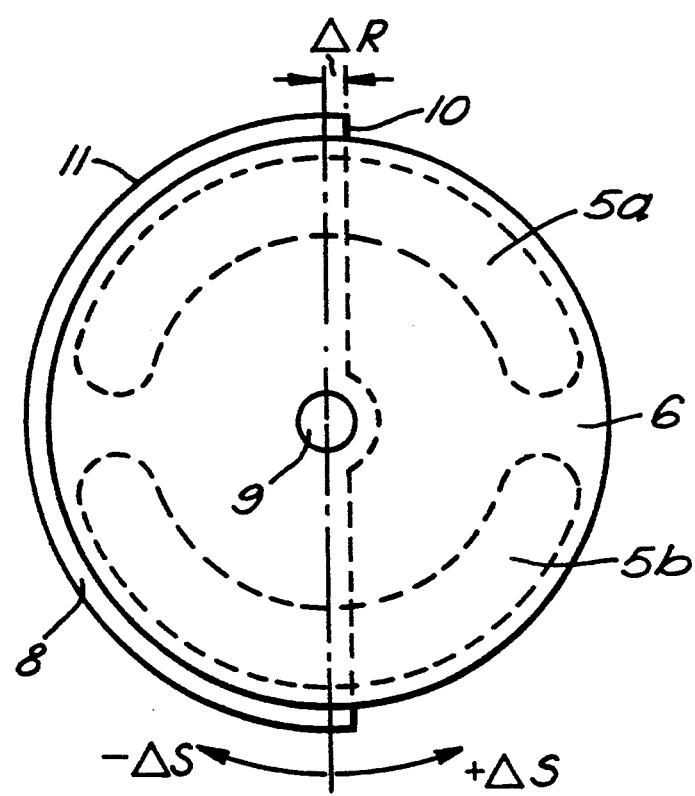

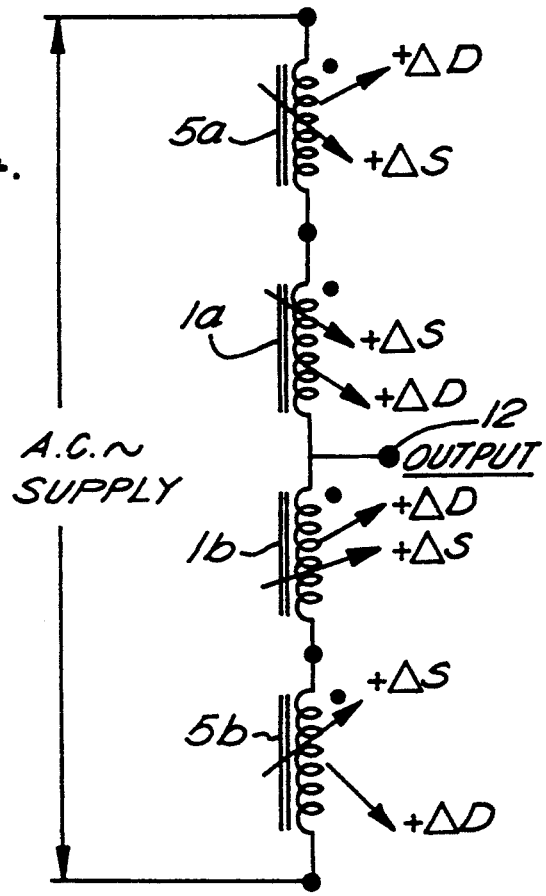
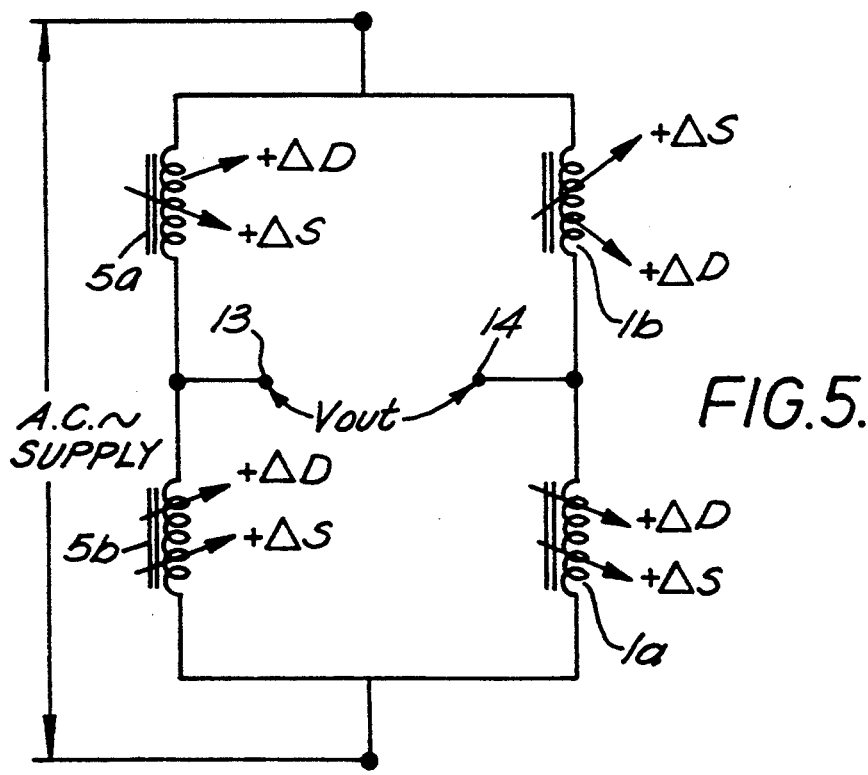

1

TRANSDUCERS

BACKGROUND OF THE INVENTION

This invention relates to transducers, and in particular transducers wherein a mechanical movement produces a change in an impedance offered to an AC signal. By way of example, various embodiments of such transducers are described in international patent application number WO 90/04152 and UK patent number GB 2223590.

SUMMARY OF THE INVENTION

An object of the invention is to provide a transducer which is simple in construction yet provides an output which is highly sensitive to mechanical movement.

According to the present invention there is provided a transducer comprising a pair of inductive coils connected in series, the coils of the pair being arranged adjacent one another with respective end faces of the coils substantially mutually aligned, and a magnetically permeable member which is movable relative to the end faces in such a manner that the impedance offered to an AC signal by one coil increases while the impedance offered to the signal by the other coil decreases.

Movement of the magnetically permeable member relative to the end faces of the coils produces a change in the inductances of the coils. For example, the magnetically permeable member may be arranged to cover partially the said end faces whereby movement of the member increases the area of the end face of one coil which is covered by the member and decreases the area of the end face of the other coil which is covered by the member. Since the inductance of each coil depends on the covered area of the end face, movement of the magnetically permeable member increases the inductance of one coil and decreases the inductance of the other coil. The impedance offered by each coil to an AC signal of fixed frequency therefore increases or decreases accordingly. The amplitude of the voltage measured across either coil thus varies with the position of the magnetically permeable member, and it will be appreciated that, since the inductance of one coil increases while that of the other decreases with movement, this output voltage is highly sensitive to movement of the magnetically permeable member.

The magnetically permeable member, which is conveniently in the form of a plate, may be rotatable relative to the end faces of the coils about an axis located between the coils. In this case, the amplitude of the output voltage measured across one of the coils varies with angular position of the member. However, any axial movement (ie movement along the axis of rotation) of the magnetically permeable member either towards or away from the end faces of the coils would increase or decrease the inductance of both coils causing variations in the output voltage which are independent of the angular position of the member. Thus, very close tolerances are demanded if accurate results are to be obtained, and this may be difficult to realise in practice.

Accordingly, in a particularly preferred arrangement, the transducer comprises two pairs of inductive coils wherein respective end faces of the coils of each pair are substantially co-planar and are arranged opposite, and spaced from, respective end faces of the coils of the other pair, and wherein the magnetically permeable member comprises a plate which is located between the pairs of coils and is rotatable about an axis perpendicular to the planes of the said end faces, whereby, as the plate rotates, the inductance of one coil of each pair increases while the inductance of the other coil of each pair decreases.

The arrangement of the pairs of coils opposite one another allows the effect of any axial displacement of the plate on an output signal derived from the coils to be substantially reduced. For example, the coils may be connected in a half-bridge differential configuration such that the four coils are connected in series with each coil of one pair being directly connected to its opposite coil in the other pair. Thus, as the plate rotates, the net impedance offered to an AC signal by one coil of a pair and its opposite coil increases while the net impedance offered by the other coil of that pair and its opposite coil decreases. The output voltage taken across one coil and its opposite coil thus varies with angular position of the plate, and the advantage of high sensitivity to variations in angular position of the plate is retained. However, the effect of axial displacement of the plate on the output voltage is reduced since this voltage is taken across one coil of each pair. If the plate moves axially towards one pair of coils the inductance of these coils increases whilst the inductance of their opposite coils decreases. The effect of axial movement on the net impedance of one coil and its opposite coil, and hence on the output voltage, is therefore significantly less than its effect on the impedance of a single coil. Alternatively, the coils may be connected in a full-bridge configuration and provided that the output voltage is taken across one coil of each pair the effect of axial displacement of the plate on the output voltage is reduced.

The arrangement of the transducer is preferably such that the areas of the end faces of the coils which ape covered by the magnetically permeable member increase or decrease linearly with angular position of the magnetically permeable member so that the coil inductances also increase or decrease linearly with angular position of the member. This enables linearity in variation of the output voltage amplitude with angular position of the member to be achieved in a simple manner. Accordingly, it is preferred that the end faces of the coils of the or each pair are curved and ape arranged around the circumference of a circle, and the axis of Potation of the magnetically permeable member passes through the center of the circle. In particular, the end faces of the coils of the or each pair are preferably arranged diametrically opposite one another around the circumference of the circle, and the magnetically permeable member preferably comprises a generally semicircular plate fop covering approximately half of the total area of the said end faces. The area of the end face of each coil covered by the plate then increases or decreases linearly with angular position of the plate. In this case, it is preferred that the plate extends radially beyond the radial extent of the coils of the or each pair to reduce the effect of any radial displacement of the plate which might result in a change in the total area of the end faces covered by the plate and hence in the impedances of the coils.

It is also preferred in this case that the coils of the of each pair are mounted on an annular magnetically permeable pole piece and are each wound on a magnetically permeable core. The material of the pole pieces, the cores and the rotatable plate is preferably a high permeability "soft" magnetic material.

BRIEF DESCRIPTION OF THE DRAWINGS

FIG. 2 is a schematic cross-section through the transducer of FIG. 1 when assembled;

FIG. 3 is a schematic plan view of the assembled transducer of FIG. 2;

FIG. 4 shows a circuit arrangement for the transducer of FIGS. 1 to 3; and

FIG. 5 shows an alternative circuit arrangement for the transducer of FIGS. 1 to 3.

DESCRIPTION OF THE PREFERRED EMBODIMENTS

Figure 1:
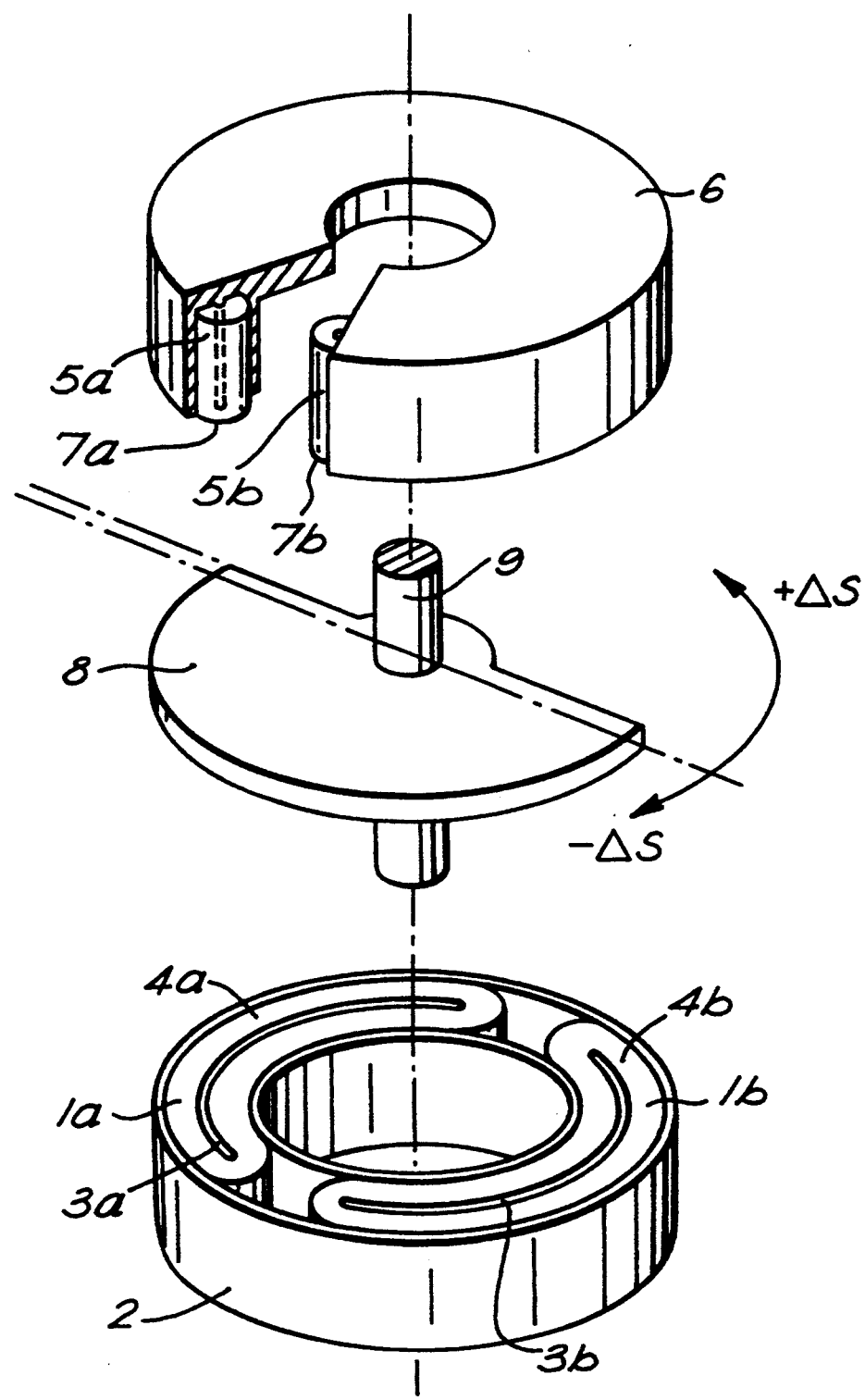
FIG. 1 is a schematic perspective view of component parts of a transducer embodying the invention.

Referring to FIG. 1, a pair of identical coils 1a and 1b of insulated wire are mounted within an annular pole piece 2 made from a high permeability "soft" magnetic material. Each coil 1a, 1b is wound on a respective core 3a, 3b of the same material as the pole piece 2. As shown in the figure, the coils 1a, 1b are curved and arranged diametrically opposite one another around the annular space defined by the pole piece 2. The coils have exposed end faces 4a and 4b which are substantially coplanar.

Another pair of coils 5a and 5b, identical to the coils 1a and b, are similarly mounted in a further pole piece 6 identical to the pole piece 2. Part of the pole piece 6 has been cut away in FIG. 1 for clarity. The coils 5a and 5b have exposed end faces 7a and 7b which correspond to the end faces 4a and 4b of the coils 1a and 1b.

A magnetically permeable member in the form of a generally semicircular plate or rotor 8 is mounted on a shaft 9 for rotation relative to the pole pieces 2, 6.

FIG. 2 is a schematic cross-section through the pole pieces 2, and the rotor 8 when assembled for use. The pole pieces 2 and 6 are arranged such that the end face 4a of the coil 1a is directly opposite the end face 7a of the coil 5a. Similarly, the end face 4b of the coil 1b is directly opposite the end face 7b of the coil 5b. The rotor 8 is located between the pairs of coils and the axis of rotation of the rotor 8 defined by the shaft 9 (not shown in FIG. 2) extends at right angles to the planes of the end faces of the coils through the centers of the circles around which the coil pairs are arranged. The rotor 8 is equidistant from the planes of the end faces 4a, 4b and 7a, 7b, axial displacement of the rotor towards the pole piece 6 being indicated as $+\Delta AD$ in the figure, and axial displacement towards the pole piece 2 being indicated as $-\Delta D$.

Referring to FIG. 3, in the "zero position" of the rotor 8 shown in the figure, the rotor covers approximately half of the area of each end face 4a, 4b, 7a and 7b of the coils and hence approximately half of the total area of these end faces. As shown, however, the rotor 8 is not quite semi-circular, a straight edge 10 of the rotor 8 being offset from the parallel diameter of the circle defined by the circumferential edge 11 of the rotor by a distance defined as the "rotor offset" which is indicated as $\Delta R$ in the figure. Rotation of the rotor 8 in the anticlockwise direction with respect to the zero position shown in FIG. 3 is indicated as a positive angular displacement $+\Delta S$ and rotation in the clockwise direction a negative angular displacement $-\Delta S$.

In the circuit arrangement of FIG. 4, the coils 1a, 1b, 5a and 5b are connected in series with each coil 1a, 1b of the first pair being directly connected to its opposite coil 5a and 5b respectively. An output 12 is connected between the coils 1a and 1b. Thus, the coils are connected in a half-bridge differential configuration with the fluxes of the coils reinforcing one another when an AC supply voltage is applied across the coils as indicated in the figure.

The transducer operates to produce a linear variation in the amplitude of the signal on the output 12 in FIG. 4 with angular displacement of the rotor 8 from its zero position when a fixed frequency voltage is applied across the coils. For a positive angular displacement $+\Delta S$ of the rotor 8, the area of the end faces 4b and 7b of the coils 1b and 5b covered by the rotor 8 (or the effective length of these coils covered) increases. The inductance of these coils thus increases linearly with angular displacement $+\Delta S$. At the same time, the area of the end faces 4a and 7a of the coils 1a and 5a, or the effective length thereof, covered by the rotor 8 decreases by a corresponding amount. Thus, the inductance of these coils decreases by an amount corresponding to the increase in the inductance of the coil 1a and 5a. (The increase or decrease of the inductance of the coils 1a, 1b, 5a and 5b with positive angular displacements $+\Delta S$ are indicated by rising and falling arrows respectively in FIG. 4.) The total impedance offered to the input signal by the coils 1a, 1b, 5a and 5b remains constant but the amplitude of the output voltage across the coils 1b and 5b increases linearly with the angular displacement $+\Delta S$ as the net impedance of the coils 1b and 5b increases.

Similarly, for negative angular displacements of the rotor 8, $-\Delta S$, the inductance of the coils 1a and 5a increases while the inductance of the coils 1b and 5b decreases by a corresponding amount. Thus, the amplitude of the output voltage taken across the coils 1b and 5b decreases linearly with negative angular displacement of the rotor 8. The output voltage is highly sensitive to angular movement of the rotor 8 since the impedance of the coils 1a and 5a decreases/increases as the impedance of the coils 1b and 5b increases/decreases.

The arrangement of the transducer also provides at least partial compensation for the effect of any axial displacement $\pm\Delta D$ of the rotor 8 such as may occur through vibration of the transducer in use. The magnetic flux density at a point in the rotor between the coils 1a and 5a due to each of these coils changes in a non-linear manner with distance of that point from the corresponding pole piece 2, 6, being roughly inversely proportional to the square of the distance from the pole piece. Thus, for positive axial displacement $+\Delta D$ of the rotor 8, the inductance of the coils 5a and 5b increases while that of the coils 1a and 1b decreases.

The increase or decrease of inductance with positive axial displacement $+\Delta D$ of the rotor is indicated by a rising or falling arrow in FIG. 4. Due to the non-linear variation of flux density with distance, the increase in the flux density due to, for example, the coil 5a will not be exactly compensated for by the decrease in the flux density due to the coil 1a. However, with the coils connected as indicated in FIG. 4, an increase in the inductance of the coils 5a and 5b for positive axial displacement $+\Delta D$ will be at least partially compensated for by the decrease in the inductance of the coils 1a and 1b respectively. Similarly, the increase in the inductance of the coils 1a and 1b for negative axial displacements $-\Delta D$ is partially compensated for by the decrease in the inductance of the coils 5a and 5b respectively. Thus, it will be seen that the sensitivity of the signal on the output 12 to axial displacement of the rotor 8 is reduced.

FIG. 5 shows an alternative circuit arrangement to that of FIG. 4, the coils being connected in a full-bridge configuration. As in FIG. 4, the variations in inductance of the coils with angular displacements $\pm \Delta S$ and axial displacements $\pm \Delta D$ of the rotor 8 are indicated by rising or falling arrows in FIG. 5. In FIG. 5, the output voltage $V_{out}$ is taken between terminals 13 and 14 and is thus the difference between the voltage levels at these terminals. Again, it will be understood that the output voltage amplitude varies linearly with angular position of the rotor 8, being zero in this case at the zero position of the rotor and changing sign as the zero position is traversed. Also, as before, the effect of axial displacement $\pm \Delta D$ of the rotor on the output voltage is reduced since the output voltage is taken across one coil of each pair.

It is to be noted that the effect of temperature variations on the output in the circuits of FIGS. 4 and 5 is reduced since the output voltage depends on a ratio of impedances in each case.

As shown in FIGS. 2 and 3, the rotor 8 extends radially outwardly beyond the radial extent of the pole pieces 2, 6. This is to ensure that the radial displacement of the rotor in the direction of the straight edge thereof, for example due to vibration, will not change the coil impedances by changing the total area of the end faces of the coils which is covered by the rotor. The effect of radial displacement in other directions on coil impedances is also reduced.

The rotor offset $\Delta R$ is provided to compensate for coil end effects and magnetic fringing. In particular, the rotor offset compensates for the fact that one end of each coil end face is usually covered by the rotor while the other end is exposed, so that there is uneven flux linkage between the two ends of the coil end face and its opposite coil.

It will be appreciated that there are numerous possible applications of the transducer described above. For example, the transducer may be used to tune a radio receiver, to sense the angular position of a robot arm or an aircraft control surface, or to measure the angle of tilt in an inclinometer by allowing the rotor to move under the influence of gravity.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

We claim:

1. A transducer comprising a pair of inductive coils connected in series, the coils of the pair being arranged adjacent one another and having respective end faces which are substantially mutually aligned and arranged diametrically opposite one another around the circumference of a circle, and a magnetically permeable member comprising a generally semi-circular plate for covering approximately half of the total area of the said end faces, the plate being rotatable relative to the said end faces about an axis which passes through the center of the circle and having an arcuate edge and a straight edge which is parallel to a diameter of the circle and offset therefrom in a direction away from the arcuate edge, whereby rotation of the plate increases the area of the end face of one coil which is covered by the plate and decreases the area of the end face of the other coil which is covered by the plate such that the impedance offered to an AC signal by one coil increases while the impedance offered to the signal by the other coil decreases.

2. A transducer according to claim 1, wherein the plate extends radially beyond the radial extent of the coils.

3. A transducer according to claim 1, comprising a further pair of inductive coils having respective end faces which are substantially mutually aligned and arranged diametrically opposite one another around the circumference of a further circle, wherein respective end faces of the coils of each pair are arranged opposite, and spaced from, respective end faces of the coils of the other pair, and wherein the magnetically permeable plate is located between the pairs of coils.

4. A transducer according to claim 3, wherein the plate extends radially beyond the radial extent of the coils.

5. A transducer according to claim 3, wherein the coils are connected in a half-bridge differential configuration such that the four coils are connected in series, with each coil of one pair being directly connected to its opposite coil in the other pair.

6. A transducer according to claim 3, wherein the coils are connected in a full-bridge configuration.

* * * * *